US006483515B1

(12) United States Patent
Hanko

(10) Patent No.: US 6,483,515 B1
(45) Date of Patent: Nov. 19, 2002

(54) METHOD AND APPARATUS FOR DISPLAYING DATA PATTERNS IN INFORMATION SYSTEMS

(75) Inventor: James G. Hanko, Redwood City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/289,798

(22) Filed: Apr. 9, 1999

(51) Int. Cl.$^7$ ................................................. G09G 5/36
(52) U.S. Cl. ..................... 345/545; 345/501; 345/502; 345/530; 345/531; 709/203; 709/217; 709/218; 709/219
(58) Field of Search ................................. 345/418, 430, 345/501, 502, 530, 545, 531, 568; 358/456; 395/124, 132; 709/245–247, 223–226, 217–219

(56) References Cited

U.S. PATENT DOCUMENTS

| 5,179,640 | A | * | 1/1993 | Duffy ........................... 395/132 |
| 5,313,567 | A | * | 5/1994 | Civanlar et al. ............. 395/124 |
| 5,454,076 | A | * | 9/1995 | Cain et al. .................... 345/531 |
| 5,673,120 | A | * | 9/1997 | Fujii ............................. 358/456 |
| 5,959,632 | A | * | 9/1999 | Hashimoto et al. .......... 345/430 |
| 6,064,407 | A | * | 5/2000 | Rogers ......................... 345/568 |
| 6,091,418 | A | * | 7/2000 | Smith et al. .................. 345/418 |
| 6,229,544 | B1 | * | 5/2001 | Cragun ......................... 345/418 |
| 6,329,997 | B1 | * | 12/2001 | Wu et al. ...................... 345/519 |
| 6,333,750 | B1 | * | 12/2001 | Odryna et al. ............... 345/1.1 |
| 6,400,361 | B2 | * | 6/2002 | Toffolo ......................... 345/213 |

* cited by examiner

Primary Examiner—Ayaz Sheikh
Assistant Examiner—Thu Ha Nguyen
(74) Attorney, Agent, or Firm—O'Melveny & Myers LLP

(57) ABSTRACT

A method of updating a remote display device associated with a remote system to fill at least a portion of a display area on the display device with a tiled pattern including repetitions of a tile image data stored at a host system interconnected to the remote system via a communication link. The host system determines the number of replications of the tile image data to fill the display area and transmits display information to the remote system via the communication link, including: the tile image data; a number of repetitions of said tile image data to fill said portion of said display area; and coordinate data representing the position of the display area on the display device. The remote system receives the display information and generates the tile pattern by performing steps including: storing the tile image data starting at a location in an on-screen frame buffer corresponding to a coordinate location within the display area relative to said display area coordinate data; and copying the tile image data into the frame buffer until said portion of the display area is filled with said tiled pattern.

26 Claims, 5 Drawing Sheets

METHOD AND APPARATUS FOR DISPLAYING DATA PATTERNS IN INFORMATION SYSTEMS

BACKGROUND OF THE INVENTION

1. Field of the Invention

This invention relates to the field of computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

Computer systems can display a variety of data on a display. Often, the background layer of a display shows a pattern that a user can select. Often these backgrounds are generated by repeating a single tile to fill the display area. For example, Internet web pages with textured background are usually rendered as a tile pattern. Existing rendering methods require the use of off-screen memory to store the tile pattern. The tile pattern is then transferred to on-screen memory for display. However, in some computer systems, the display devices may not include any off-screen memory. As such, the entire background comprised of multiple instances of the tile pattern needs to be transmitted for display on the terminal. However, transmitting the entire tile pattern is time consuming and wastes valuable computational time and resources.

SUMMARY OF THE INVENTION

The present invention provides a method of updating a display device to fill at least a portion of a display area on the display device with a tiled pattern including repetitions of a tile image data stored at a host system interconnected to the remote system via a communication link. The display method comprises the host system determining the number of replications of the tile image data to fill the display area and transmitting display information to the remote system via the communication link, including: the tile image data; and replication information. The remote system receives the display information and generates the tile pattern by performing steps including: storing the tile image data starting at a location in an on-screen frame buffer corresponding to a coordinate location within the display area; and copying the tile image data into the frame buffer based on the replication information until said portion of the display area is filled with said tiled pattern.

The transmitted display information can further include a coordinate location on the display device for each repetition of the tile image, wherein the remote system copies the tile image data into the frame buffer at locations corresponding to the coordinate locations on the display device. The display area can comprise a non-rectangular display region and a non-display clipped region. In that case, host system divides the display region into one or more rectangular display regions and performing the above steps for each rectangular display region utilizing at least a portion the tile image data for filling each rectangular display region with repetitions of said portion of the tile image data.

In another aspect the present invention provides an apparatus for implementing the above steps.

BRIEF DESCRIPTION OF THE DRAWINGS

These and other features, aspects and advantages of the present invention will become better understood with regard to the following description, appended claims and accompanying drawings where:

DETAILED DESCRIPTION

The invention is a method and apparatus for providing tiled backgrounds or images. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Figure 1:
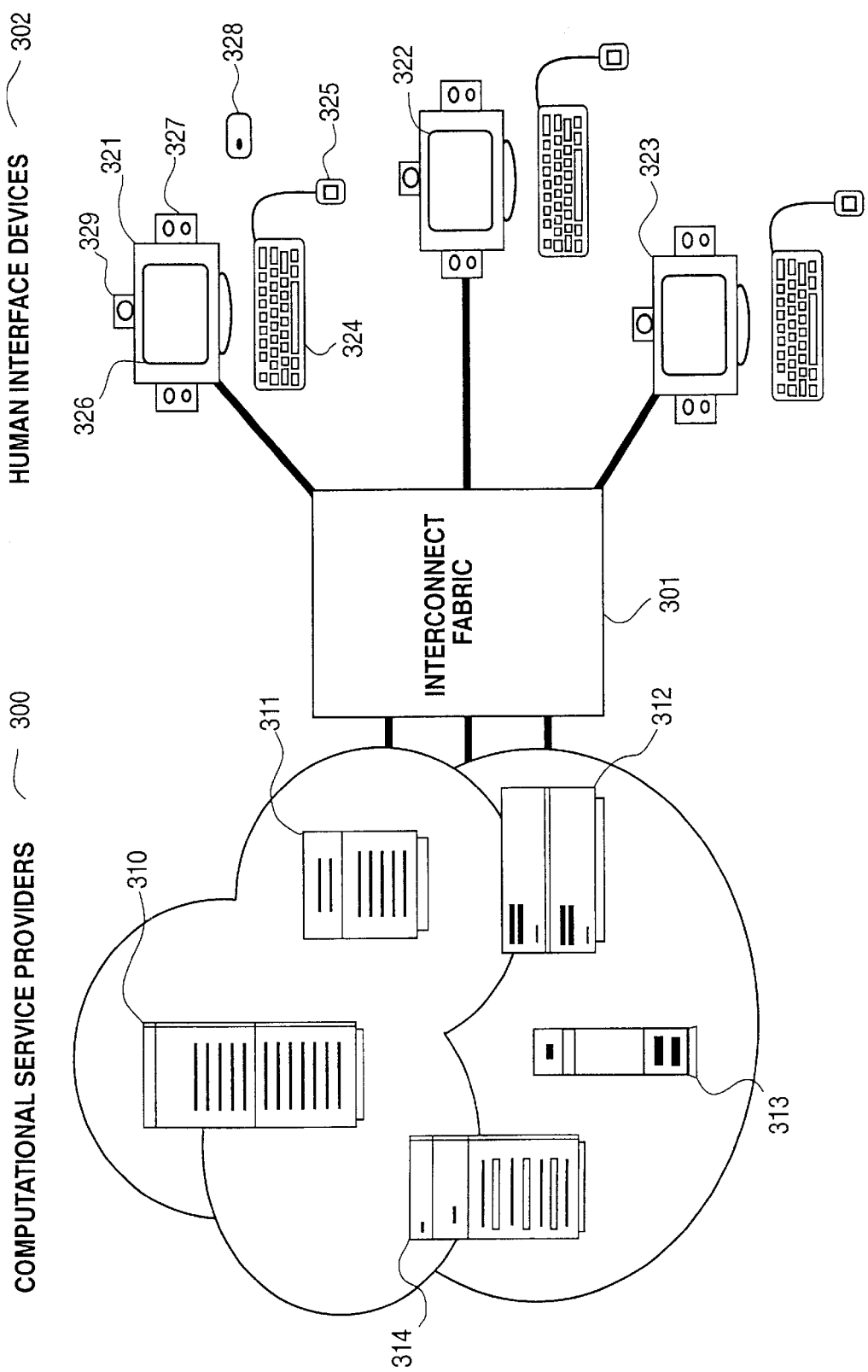
FIG. 1 illustrates a virtual desktop environment.

FIG. 1 shows an example architecture of an information processing system in which the present invention can be implemented. A virtual desktop system architecture according to an aspect of the present invention provides a re-partitioning of functionality between a central server installation and end user hardware. Data and computational functionality are provided by data sources via a centralized processing arrangement. At the user end, all functionality is eliminated except that which generates output to the user (e.g. display and speakers), takes input from the user (e.g. mouse and keyboard) or other peripherals that the user may interact with (e.g. scanners, cameras, removable storage, etc.). All computing is done by the central data source and the computing is done independently of the destination of the data being generated. The output of the source is provided to a workstation or terminal, referred to here as a "Human Interface Device" (HID). The HID is capable of receiving the data and displaying the data.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 1, wherein the system comprises computational service providers 300 communicating data through communication link 301 to HIDs 302.

The computational power and state maintenance is provided by the service providers or services. The services are not tied to a specific computer, but may be distributed over one or more traditional desktop systems such as described in connection with FIG. 1, or with traditional servers. One computer may have one or more services, or a service may be implemented by one or more computers. The service provides computation, state and data to HIDs and the service is under the control of a common authority or manager. In FIG. 1, the services are provided by computers 310, 311, 312, 313 and 314. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID. currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sum MediaCenter could be used to provider video service, a Hydra based NT machine could provide applet program execution services.

The service providing computer system connect directly to the HIDs through the interconnect fabric. It is also possible for the service producer to be a proxy for another device providing the computational service, such as a database computer in a three tiered architecture, where the proxy computer might only generate queries ad execute user interface code.

The interconnection fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and other. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 1 illustrates HIDs 321, 322 and 323. Each HID comprises a display 326, a keyboard 324, mouse 325, and audio speakers 327. The HID includes the electronics need to interface these devices to the interconnection fabric and to transmit to and receive data from the services.

Figure 2:
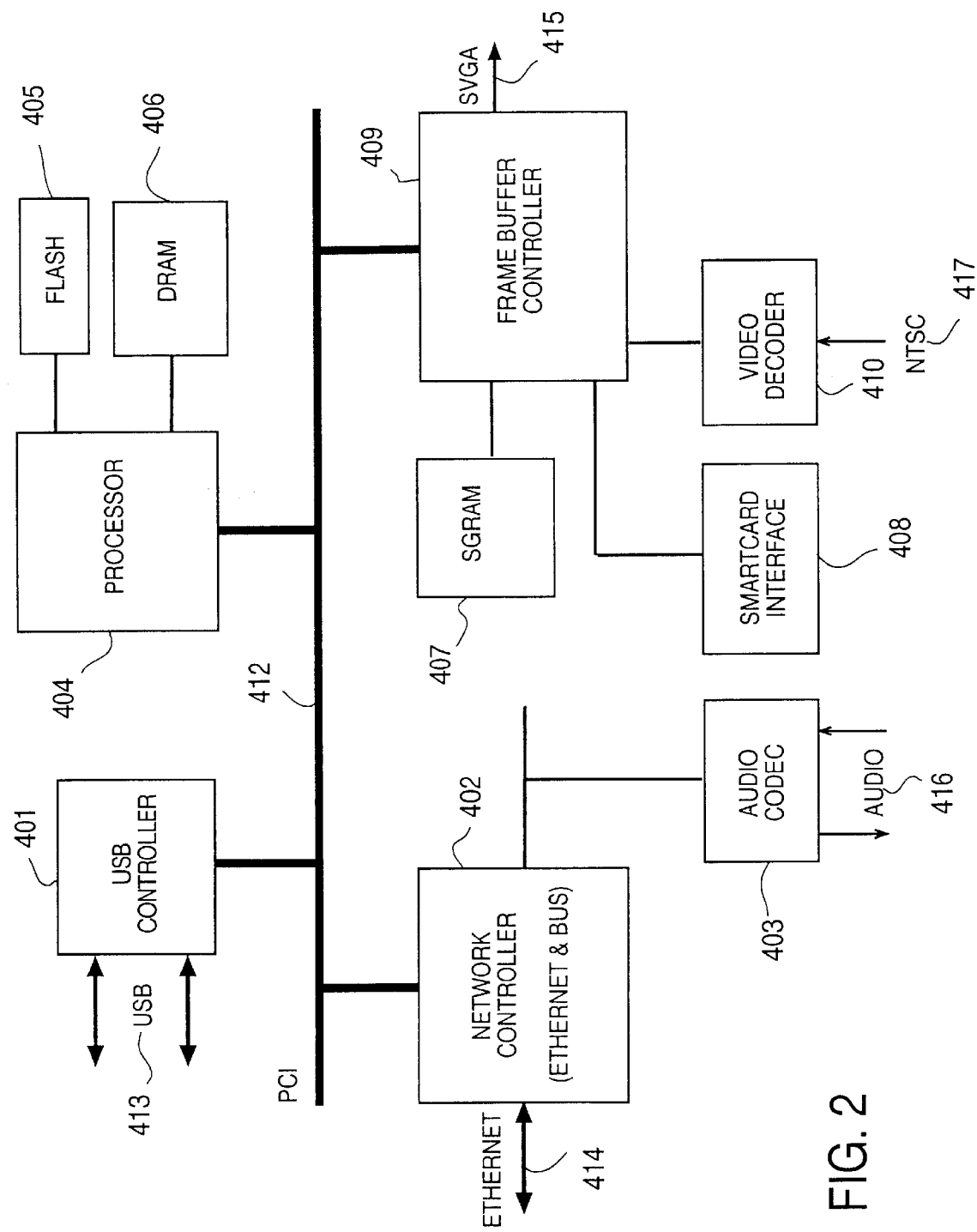
FIG. 2 is a block diagram of one embodiment of an HID remote system of FIG. 1.

A block diagram of an example embodiment of the HID is illustrated in FIG. 2. The components of the HID are coupled internally to a PCI bus 412. A network control block 402 communicates to the interconnect fabric, such as an Ethernet, through line 414. An audio codec 403 receives audio data on interface 416 and is coupled to block 402. USB data communication is provided on lines 413 to a USB controller 401. The HID further comprises a embedded processor 404 such as a Sparc2ep with coupled flash memory 405 and DRAM 406. The USB controller 401, the network controller 402 and the embedded processor 404 are all coupled to the PCI bus 412. A video controller 409, also coupled to the PCI bus 412, can include an ATI Rage128 frame buffer controller (or any other suitable controller) which provides SVGA output on the line 415. NTSC or PAL data is provided into the video controller through video decoder 410. A smartcard interface 408 may also be coupled to the video controller 409.

Figure 3:
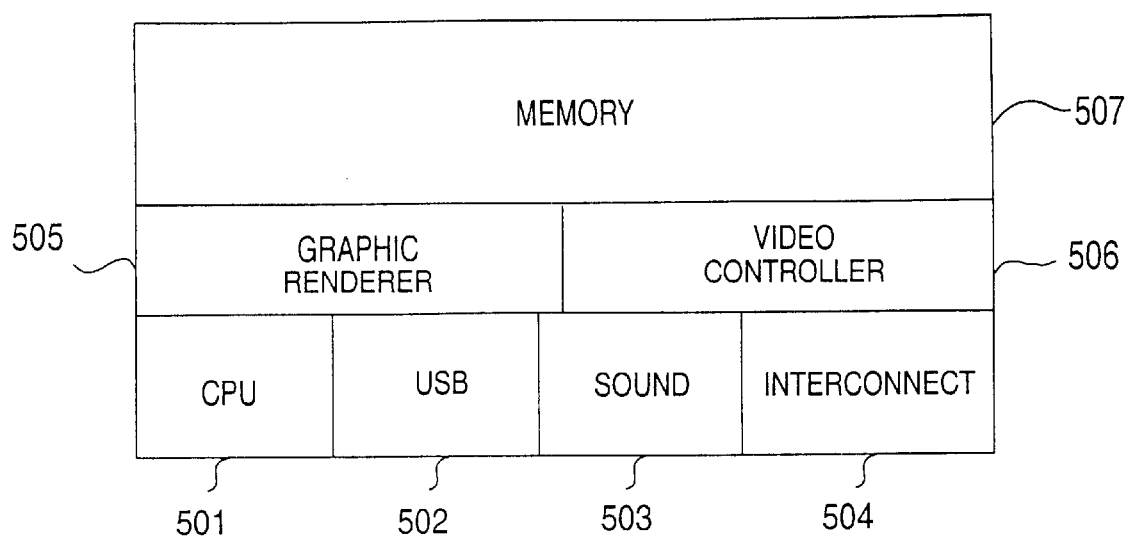
FIG. 3 illustrates a single chip embodiment of the HID system of FIG. 2.

Alternatively, the HID can comprise a single chip implementation as illustrated in FIG. 3. The single chip includes the necessary processing capability implemented via CPU 501 and graphics renderer 505. Chip memory 507 is provided, along with video controller/interface 506. A internal bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in on-volatile memory or it can be loaded through the interconnection interface when the device is powered.

The operation of the virtual desktop system architecture is described in copending U.S. patent application Ser. No. 09/063,335, assigned to the assignee, filed Apr. 20, 1998, entitled "Method and Apparatus for Providing A Virtual Desktop System Architecture" and assigned to the present assignee, and incorporated herein by reference.

Display Generation

For efficient display of image data such as tiled background data on the display device 326 of the HID 321, the present invention provides a method of updating an HID display device 326 to fill at least a portion of a display area 602 on the display device 326 with a tiled pattern including repetitions of a tile image 600 data stored at one of a service computer system 312. This generally includes rendering one area of the onscreen (visible) memory of the HID 321 within the display area to be filled with a copy of a tile image 600 and then copying the image 600 to the other desired locations in the display area 602. As such, one copy of a tile image 600 is transmitted from the service computer 312 to the HID 321 via the link 301, saving transmission time and bandwidth.

Figure 4:
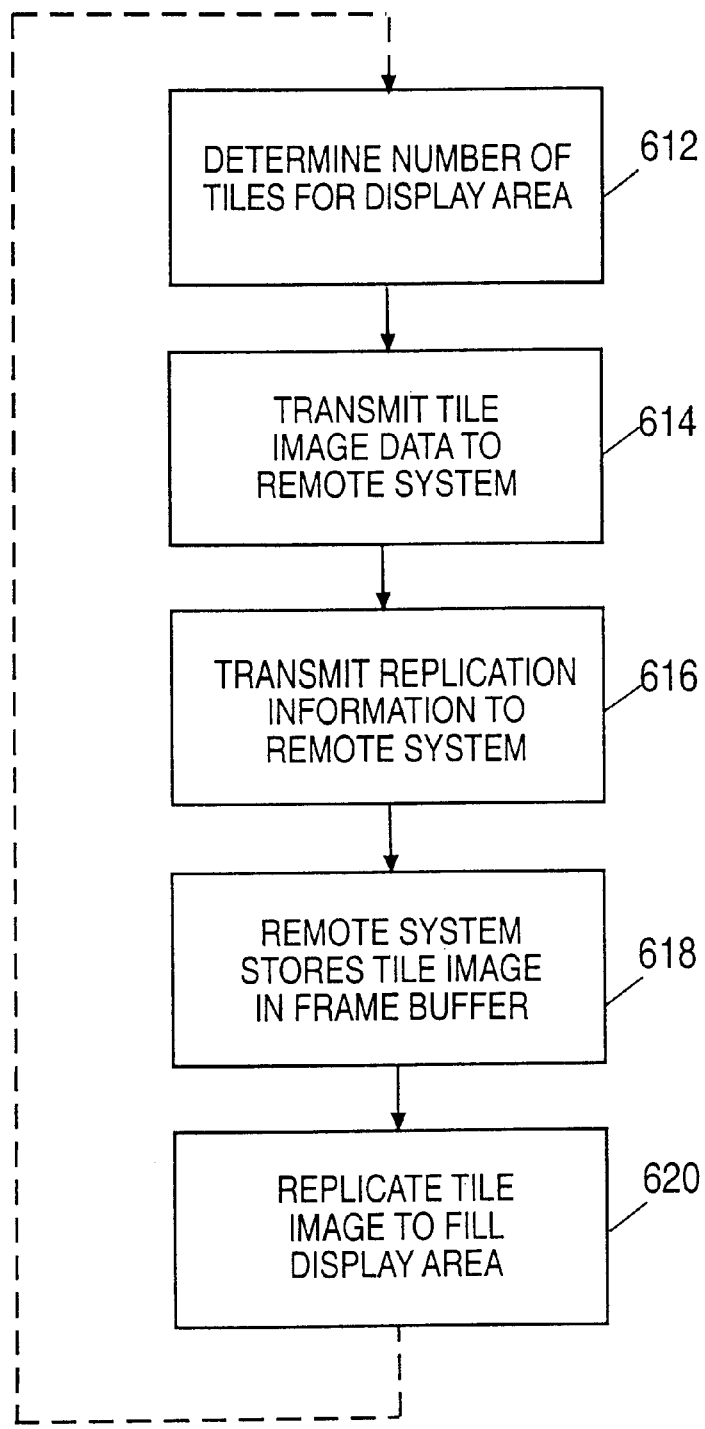
FIG. 4 is an example flowchart of the steps of an embodiment of a display method according to an aspect of the present invention.

Referring to FIG. 4 in one embodiment, the display method includes the steps of the service computer system 312 determining the number of repetitions of the tile image 600 to fill at least a portion of the display area 602 (step 612) and transmitting display information to the HID 321 via the interface fabric 301, including a tile image data (step 614), and replication information including information representing a number of repetitions of said tile image data to fill said portion of said display area 602 (step 616). The HID 321 receives the display information and generates the tile pattern by performing steps including storing the tile image data starting at a location in an on-screen frame buffer corresponding to a coordinate location within the display area relative to said display area 602 (step 618); and copying the tile image data into the frame buffer based on the replication information until the portion of the display area 602 is filled with a tiled pattern (step 620).

The display information can further include a coordinate location on the display device 326 for each repetition of the tile image 600, whereby the HID 321 copies the tile image data into the frame buffer at locations corresponding to the coordinate locations on the display device 326. The HID 321 can further perform desired image processing of the received tile image data before displaying on the display device.

The service computer 312 includes a graphics rendering means whereby the service computer handles 312 tiling of the display device 326 of an HID 321. Because the service computer 312 manages the desktop of the session on the HID 321, the rendering means is aware of the status of the information displayed on the display device 326, and of the sizes, shapes and overlapping of various display areas 602 such as the screen background and windows.

In an example implementation of the above method, a tiled pattern is displayed as background on the display device 326 of an HID 321, wherein the tile image data is transmitted from the service computer 312 to the HID 321 over the interconnect fabric 301. The tile image 600 is rectangular, having a width and a height and the user can select the location on the display device 326 where tiling begins, or by default tiling begins at, for example, the upper left corner of the display device 326. Thereafter tiling proceeds horizontally or vertically and wraps around until the background display area 602 is filled with repetitions of tile image 600.

If the area to be tiled is smaller than the tile image in the horizontal or vertical dimension, only the applicable part of the tile is sent, and it is replicated in the dimension that is larger than the tile.

Figure 5:
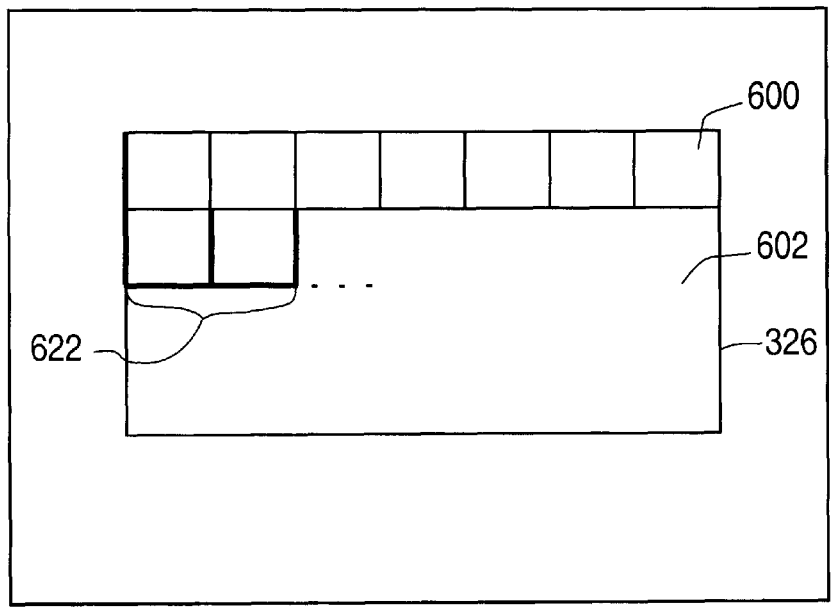
FIG. 5 illustrates an example screen snapshot of an HID display device with partial tiling according to the method of FIG. 4.

Referring to FIG. 5, the display area 602 to be tiled can be a rectangle of a width and height which can be filled with a number N of the tile images 600. In that case, the service computer 312 transmits one tile width and height of image data to the HID 321. The service computer 312 also transmits a set of N copy commands to the HID using the aforementioned wire protocol, wherein each copy command specifies, among others, the offset on the display device 326 relative to a selected or default origin where the transmitted tile image data is to be copied such that the entire display area 602 is covered by the repetitions of the tile image 600.

Upon receiving the tile image data, the HID 321 can process the data such as by rotating the tile image data before replication and display. The tile image data is stored in a local on-screen frame buffer in the HID 321. In response to each copy command, the HID 321 copies the processed tile image data from one location in the buffer to another location indicated by the offset specified in the copy command.

In another embodiment, the service computer 312 sends a copy of the tile image data, a set of N offset values and a replicate command to the HID 321 for replicating the tile image data to the offset location on the display device 326 to fill the display area 602 with the tile pattern. Yet, in another embodiment, the service computer 312 sends a copy of the tile image data, the dimensions of the display area 602 and a replicate command to the HID 321 and the HID 321 determines the offsets for the replications of the tile image data in the display area 602 and replicates the tile image data according to said offsets. Other protocols for commanding the HID 321 to replicate the tile image 600 are possible and include use of video commands provided by the aforementioned wire protocol according to another aspect of the present invention.

The display area can include a non-rectangular display region 605 and a non-display clipped region. In that case, the service computer 312 divides the display region 605 into one or more rectangular display regions and performs the above steps for each rectangular display region utilizing at least a portion the tile image data for filling each rectangular display region with repetitions of the portion of the tile image data.

Figure 6:
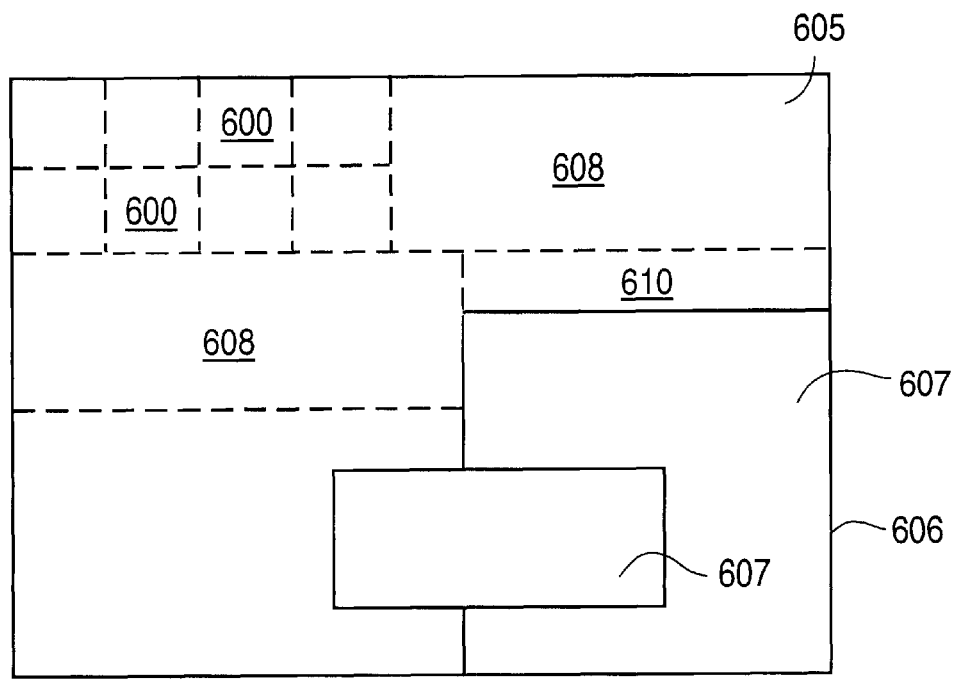
FIG. 6 illustrates non-rectangular or clipped display areas on the HID display device.

Referring to FIG. 6, for example, where the display area 602 is not rectangular, such as the screen background clipped by a window 607, or the display area is a rectangle of a width and height where the entire rectangle cannot be filled with whole tile images, the rendering system divides the display area into a first set of sub-rectangles 608 which can be filled with whole tile images, and a second set of sub-rectangles 610 which can be filled with partial tile images. For each sub-rectangle 608 in the first set, the service computer 312 transmits a whole tile image data-and one or more copy commands with offsets to the HID 321 to fill the sub-rectangle 608 with the transmitted tile image data as described above. And, for each sub-rectangle 610 in the second set, the service computer transmits a partial tile image data to fill the sub-rectangle 610 and one or more copy commands with offsets for filling the sub-rectangle 610 with the transmitted partial tile image data as described above.

The above steps can be applied successively to data displayed in windows 607 representing display areas in a windowing system. Where there are overlapping windows 607, the service computer 312 utilizes a clip list to keep track of the desktop status at the HID 321 for updating the various windows 607 with tile or other display information as described above.

In another embodiment, in order to reduce the number of copy commands and associated parameters transmitted from the service computer 312 to the HID 321, the service computer 312 can generate a super-tile image 622 comprising two or more tile images 600. The super-tile image data is then transmitted to the HID 321 as described above. For example, if the tile image 600 is a 2×2 square and the display area 602 is a 8×8 square, instead of transmitting an image data for the 2×2 tile and then sixteen copy commands with associated offsets, the service computer 312 generates a 4×4 square supertile image comprising four 2×2 tile images, and transmits the super-tile image with four copy commands and associated offsets to the HID 321.

In another example, the service computer 312 can generate a 4×8 rectangular super-tile image 622 comprising eight 2×2 tile images 600, and transmits the super-tile image data with two copy commands as associated offsets to the HID 321. As such, in either example, the number of copy commands and offsets transmitted over the interconnect fabric is 301 reduced. The HID 321 then replicates the super-tile images in response to the copy commands and associated offsets as described above. The size of the super-tile image 622 can be selected based on the relative time and cost of transmitting image data compared to that for transmitting copy commands over the interconnect fabric 301.

The service computer 312 and the HID 321 can be programmed by program instructions to perform the steps detailed above and according to the attached protocol.

Although the present invention has been described in considerable detail with regard to the preferred versions thereof, other versions are possible. Therefore, the appended claims should not be limited to the descriptions of the preferred versions contained herein.

What is claimed is:

1. In an information processing system including a host system interconnected to a remote system via a communication link, a method of updating a remote display device associated with said remote system to fill at least a portion of a display area on the display device with a tiled pattern including repetitions of a tile image data stored at the host system, the method comprising the steps of:

(a) the host system determining the number of repetitions of the tile image data to fill said portion of the display area and transmitting display information to the remote system via the communication link, the display information including:
  (1) said tile image data; and
  (2) replication information including: (i) information representing a number of repetitions of said tile image data to fill said portion of said display area, and (ii) coordinate data representing the position of the display area on the display device; and (b) the remote system receiving the display information and generating said tile pattern by performing steps including:
  (1) storing the tile image data in a frame buffer starting at a location corresponding to a coordinate location within the display area relative to said display area coordinate data; and
  (2) replicating the tile image data into the frame buffer based on the replication information until said portion of the display area is filled with said tiled pattern.

2. The method of claim 1 wherein: (i) transmitting display information from the host system to the remote system further comprises transmitting a coordinate location on the display device for each repetition of the tile image, and (ii) copying tile image data by the remote system comprises copying the tile image data into the frame buffer at locations corresponding to said coordinate locations on the display device.

3. The method of claim 1 further comprising the step of the remote system performing image processing of the received tile image data before displaying on the display device.

4. The method of claim 1, wherein: (i) the tile image is rectangular and (ii) the display area is rectangular.

5. The method of claim 1, wherein the display area is rectangular and comprises a non-rectangular display region and a non-display clipped region, said method further comprising the steps of the host system dividing the display region into one or more rectangular display regions and performing the steps (a) and (b) for each rectangular display region utilizing at least a portion the tile image data for filling each rectangular display region with repetitions of said portion of the tile image data.

6. The method of claim 1, wherein (a) the host system comprises a data source system, and (b) the remote system comprises a human interface device.

7. The method of claim 1, wherein said display area coordinate data comprises an offset specifying the position of the display area relative to an origin coordinate on the display device.

8. The method of claim 1, wherein the information processing system comprises a plurality of host systems and a plurality of remote systems with associated display devices.

9. In an information processing system including a host system interconnected to a remote system via a communication link, a method of updating a remote display device associated with said remote system to fill at least a portion of a display area on the display device with a tiled pattern including repetitions of a tile image data stored at the host system, the method comprising the steps of:

(a) the host system determining the number of repetitions of the tile image data to fill said portion of the display area and transmitting display information to the remote system via the communication link, the display information including:
  (1) said tile image data; and
  (2) replication information including; (i) replication commands corresponding to a number of repetitions of said tile image data to fill said portion of said display area, and (ii) a coordinate location on the display device for each repetition of the tile image; and (b) the remote system receiving the display information and generating said tile pattern by performing steps including:
  (1) storing the tile image data in a frame buffer starting at a location corresponding to a coordinate location within the display area relative to said display area coordinate data; and
  (2) replicating the tile image data into the frame buffer at locations corresponding to said coordinate locations on the display device in response to the replication commands until said portion of the display area is filled with said tiled pattern.

10. The method of claim 9, wherein the display area is rectangular and comprises a non-rectangular display region and a non-display clipped region, said method further comprising the steps of the host system dividing the display region into one or more rectangular display regions and performing the steps (a) and (b) for each rectangular display region utilizing at least a portion the tile image data for filling each rectangular display region with repetitions of said portion of the tile image data.

11. The method of claim 9 further comprising the step of the remote system performing image processing of the received tile image data before displaying on the display device.

12. The method of claim 9, wherein (a) the host system comprises a data source system, and (b) the remote system comprises a human interface device.

13. The method of claim 9, wherein the information processing system comprises a plurality of host systems and a plurality of remote systems with associated display devices.

14. An information processing system including a host system interconnected to a remote system via a communication link for updating a remote display device associated with said remote system to fill at least a portion of a display area on the display device with a tiled pattern including repetitions of a tile image data stored at the host system, wherein:

the host system is configured by program instructions for determining the number of repetitions of the tile image data to fill the display area and for transmitting display information to the remote system via the communication link, the display information including:
  (a) said tile image data; and
  (b) replication information including: (1) information representing a number of repetitions of said tile image data to fill said portion of said display area, and (2) coordinate data representing the position of the display area on the display device; and the remote system is configured by program instructions for receiving the display information and generating said tile pattern by performing steps including:
  (c) storing the tile image data in a frame buffer starting at a location corresponding to a coordinate location within the display area relative to said display area coordinate data; and (d) replicating the tile image data into the frame buffer based on the replication information until said portion of the display area is filled with said tiled pattern.

15. The information system of claim 14 wherein: (i) the host system further incudes program instructions for transmitting a coordinate location on the display device for each repetition of the tile image, and (ii) the remote system further includes program instructions for copying the tile image data into the frame buffer at locations corresponding to said coordinate locations on the display device.

16. The information system of claim 14 wherein the remote system further includes program instructions for performing image processing of the received tile image data before displaying on the display device.

17. The information system of claim 14, wherein the display area is rectangular and comprises a non-rectangular display region and a non-display clipped region, and wherein the host system further includes program instructions for dividing the display region into one or more rectangular display regions and performing the steps (a) through (d) for each rectangular display region utilizing at least a portion the tile image data for filling each rectangular display region with repetitions of said portion of the tile image data.

18. The information system of claim 14, wherein (a) the host system comprises a data source system, and (b) the remote system comprises a human interface device.

19. The information system of claim 14, wherein the information processing system comprises a plurality of host systems and a plurality of remote systems with associated display devices.

20. In an information processing system including a host system interconnected to a remote system via a communication link, a display system for updating a remote display device associated with said remote system to fill at least a portion of a display area on the display device with a tiled pattern including repetitions of a tile image data stored at the host system, the display system comprising:

means at the host system for determining the number of replications of the tile image data to fill the display area, means for transmitting display information from the host system to the remote system via the communication link, the display information including:

(a) said tile image data;

(b) replication information including: (1) replication commands corresponding to a number of repetitions of said tile image data to fill said portion of said display area, and (2) a coordinate location on the display device for each repetition of the tile image; and means for receiving the display information in the remote system for receiving and generating said tile pattern including:

(c) means for storing the tile image data in a frame buffer starting at a location corresponding to a coordinate location within the display area relative to said display area coordinate data; and (d) means for replicating the tile image data into the frame buffer at locations corresponding to said coordinate locations on the display device in response to the replication commands until said portion of the display area is filled with said tiled pattern.

21. The display system of claim 20, wherein the display area is rectangular and includes a non-rectangular display region and a non-display clipped region, and wherein the display system further includes means at the host system for dividing the display region into one or more rectangular display regions and for each rectangular display region utilizing at least a portion the tile image data for filling each rectangular display region with repetitions of said portion of the tile image data.

22. The display system of claim 20 further comprising means for performing image processing of the received tile image data before displaying on the display device.

23. The display system of claim 20, wherein (a) the host system comprises a data source system, and (b) the remote system comprises a human interface device.

24. The display system of claim 20, wherein the information processing system comprises a plurality of host systems and a plurality of remote systems with associated display devices.

25. The method of claim 1, wherein the display device can only be accessed by the host system through the remote system.

26. The method of claim 6, wherein the host system can only be accessed by the human interface device through the remote system.

* * * * *